(12) United States Patent
Kumar et al.

(10) Patent No.: US 12,267,310 B2
(45) Date of Patent: Apr. 1, 2025

(54) SELF-ENCRYPTING KEY MANAGEMENT SYSTEM

(71) Applicant: Fortanix, Inc., Mountain View, CA (US)

(72) Inventors: Ambuj Kumar, Sunnyvale, CA (US); Anand Kashyap, Los Altos, CA (US); Jethro Gideon Beekman, San Francisco, CA (US); Faisal Faruqui, Fremont, CA (US)

(73) Assignee: Fortanix, Inc., Santa Clara, CA (US)

( * ) Notice: Subject to any disclaimer, the term of this patent is extended or adjusted under 35 U.S.C. 154(b) by 0 days.

(21) Appl. No.: 18/089,549

(22) Filed: Dec. 27, 2022

(65) Prior Publication Data

US 2023/0155989 A1 May 18, 2023

Related U.S. Application Data

(63) Continuation of application No. 16/806,687, filed on Mar. 2, 2020, now abandoned, which is a continuation of application No. 15/406,605, filed on Jan. 13, 2017, now Pat. No. 10,609,006.

(51) Int. Cl.
| | |
|---|---|
| *H04L 9/40* | (2022.01) |
| *G06F 21/60* | (2013.01) |
| *H04L 9/08* | (2006.01) |
| *H04L 9/32* | (2006.01) |

(52) U.S. Cl.
CPC ............ *H04L 63/06* (2013.01); *G06F 21/602* (2013.01); *H04L 9/0822* (2013.01); *H04L 9/0897* (2013.01); *H04L 9/3247* (2013.01); *H04L 63/062* (2013.01)

(58) Field of Classification Search
CPC ..... H04L 63/06; H04L 63/062; H04L 9/0897; H04L 9/0822; H04L 9/3247; G06F 21/602
See application file for complete search history.

(56) References Cited

U.S. PATENT DOCUMENTS

| | | | |
|---|---|---|---|
| 9,367,697 B1 | 6/2016 | Roth | |
| 9,442,752 B1 | 9/2016 | Roth | |
| 9,584,517 B1 | 2/2017 | Roth | |
| 9,606,940 B2 | 3/2017 | Sheller | |
| 9,660,970 B1* | 5/2017 | Rubin | H04L 9/0891 |
| 10,135,622 B2* | 11/2018 | Scarlata | H04L 9/0866 |
| 10,211,977 B1 | 2/2019 | Roth | |
| 2006/0015512 A1 | 1/2006 | Alon | |
| 2006/0020691 A1* | 1/2006 | Patterson | G06F 9/505 |
| | | | 714/E11.206 |
| 2008/0025510 A1* | 1/2008 | Yung | H04L 9/0897 |
| | | | 380/255 |

(Continued)

*Primary Examiner* — Michael R Vaughan
(74) *Attorney, Agent, or Firm* — Lowenstein Sandler LLP

(57) ABSTRACT

A system disclosed herein may receive, from an application associated with a client identification, a request to perform a cryptographic operation with a specified application key, identify a gateway associated with the client identification, identify a respective characteristic of each self-encrypting key management service of a plurality of self-encrypting key management services that correspond to the gateway, identify a self-encrypting key management service with a characteristic satisfying a threshold criterion, and send the request to the identified self-encrypting key management service.

19 Claims, 9 Drawing Sheets

(56) References Cited

U.S. PATENT DOCUMENTS

| | | |
|---|---|---|
| 2008/0123855 A1* | 5/2008 | Thomas ................. H04L 9/083 380/277 |
| 2012/0163589 A1 | 6/2012 | Johnson |
| 2016/0036854 A1* | 2/2016 | Himawan ............... H04L 63/04 726/5 |
| 2016/0188889 A1 | 6/2016 | Narendra Trivedi |
| 2016/0380985 A1 | 12/2016 | Chhabra |
| 2017/0024570 A1 | 1/2017 | Pappachan |
| 2017/0353319 A1 | 12/2017 | Scarlata |
| 2017/0366359 A1 | 12/2017 | Scarlata |
| 2018/0131677 A1 | 5/2018 | Brickell |
| 2018/0137299 A1 | 5/2018 | Porter |
| 2018/0167203 A1 | 6/2018 | Belenko |
| 2018/0183578 A1 | 6/2018 | Chakrabarti |
| 2018/0183580 A1 | 6/2018 | Scarlata |
| 2018/0205711 A1 | 7/2018 | Kumar |
| 2018/0295115 A1* | 10/2018 | Kumar ................ H04L 63/0428 |
| 2019/0044929 A1* | 2/2019 | Kashyap ............... H04L 9/3231 |
| 2019/0158474 A1* | 5/2019 | Kashyap ............... H04L 63/061 |

\* cited by examiner

SELF-ENCRYPTING KEY MANAGEMENT SYSTEM

CROSS-REFERENCE TO RELATED APPLICATIONS

[0001] The present application is a continuation of co-pending U.S. patent application Ser. No. 16/806,687, filed Mar. 2, 2020, which is a continuation of U.S. patent application Ser. No. 15/406,605 filed Jan. 13, 2017, now U.S. Pat. No. 10,609,006, each of which is incorporated herein by reference.

TECHNICAL FIELD

Aspects of the present disclosure relate generally to key management, and more specifically, relate to secure key management and cryptographic operations for applications.

BACKGROUND

An application may utilize a cryptographic operation to be performed on data. For example, the data may be encrypted data that is to be decrypted or the data may be signed by a digital signature that is to be verified. In general, the cryptographic operation may be based on the use of a cryptographic key. For example, a private key may be used to decrypt data that has been encrypted (e.g., ciphertext) or to provide a digital signature for use to authenticate the identity of a sender of a digital message. The application may securely store the private key to reduce the possibility of a third party acquiring the private key.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
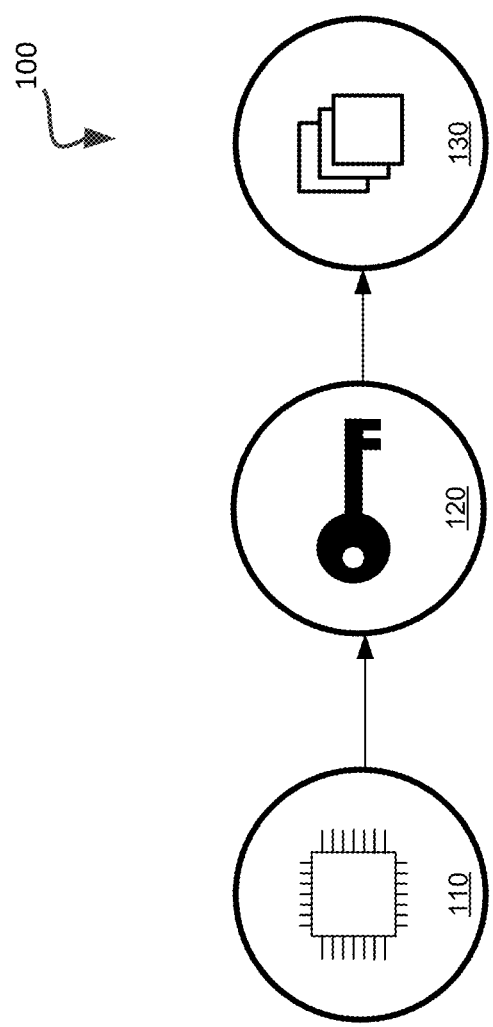
FIG. 1 illustrates an example environment to provide secure key management for applications in accordance with some embodiments.

Aspects of the present disclosure relate to a self-encrypting key management system. A data center or network cluster may include multiple network servers where each network server may host or provide one or more applications. The applications provide various functions to users where such functions may use cryptographic keys. The self-encrypting key management system may be self-encrypting so that sensitive and security-critical data are available as plain-text only to the self-encrypting key management system. Encrypting and decryption operations for the one or more applications may be performed by the self-encrypting key management system itself. For example, an authentication process may be performed by using a cryptographic key in a cryptographic operation to generate a digital signature or data (e.g., ciphertext) may be decrypted by using the cryptographic key. Since the cryptographic key (e.g., a private asymmetric key, public asymmetric key, or a symmetric key) is intended to be a secret, the cryptographic key may be securely stored.

A hardware security module (HSM) may be used in the data center or network cluster to provide cryptographic operations to the applications hosted by the network servers. The hardware security module may be a physical computing device that securely stores and manages cryptographic keys for use by the applications in the network cluster. For example, the network cluster may include multiple physical network servers as well as the HSM that is coupled over a network to the network servers. The HSM may store and manage cryptographic keys for multiple applications that are hosted or provided by different network servers. As an example, a first application may require a use of a cryptographic operation to decrypt data or to generate a digital signature for data. The first application may transmit a request over the network of the network cluster to the HSM to utilize a particular key that is stored at the HSM. In response to receiving the request, the HSM may verify the first application and perform the cryptographic operation with the particular key that is assigned to the first application. For example, the HSM may decrypt data received from the first application over the network or may generate a digital signature and sign data received from the first application over the network and may provide the result to the first application. Similarly, the HSM may store and manage another key for a second application that is hosted or provided by a second network server of the data center or network cluster. For example, the second application may also use the HSM to perform another cryptographic operation with the other key. Similarly, the HSM may generate a key. For example, a third application may also use the HSM to generate a private-public key pair or a symmetric key and use a key to perform a security sensitive cryptographic operation. Thus, the HSM may be utilized by different applications hosted or provided on different network servers across a network cluster to provide cryptographic operations to the different applications.

The use of a physical HSM in the data center or network cluster may utilize additional space. For example, the network cluster may correspond to a network rack where slots in the network rack may include one or more network servers and at least one of the slots may include the physical HSM. Thus, the presence of a physical computing device (e.g., the HSM) to provide cryptographic operations and manage cryptographic keys for applications may result in the network rack having fewer slots available for network servers. Furthermore, in some embodiments, since the applications hosted on the different network servers may communicate with the HSM via a network, a latency for the network may result in additional delay to perform the cryptographic operations for the applications as a request may be transmitted over the network from a network server hosting a respective application and a result of the cryptographic operation by the HSM may be also be transmitted over the network from the HSM to the network server.

Aspects of the present disclosure address the above and other deficiencies by providing a self-encrypting key management service (SEKMS) to be hosted or provided on a network server and to provide secure key management for other applications that are hosted or provided on the network server or another network server. The self-encrypting key management service may be another application that is hosted or provided on a network server (e.g., the same network server hosting another application or on another network server that is not hosting another application) and may provide a complete and secure key management service by other applications within a data center. The self-encrypting key management service may be considered to be on-premise of the data center (e.g., a network server of the data center provides the SEKMS) or may be considered as a software as a service (SaaS) application that is provided on another network server that is external to the data center. Furthermore, the network server may include a processor or processing device (e.g., a central processing unit) in which a set of instructions may be used to protect an address space of a memory for the self-encrypting key management service so that data of the self-encrypting key management service in the address space of the memory may not be accessible (e.g., read by or written to) by other applications or software on the network server. For example, an application and its associated data may be placed into a secure enclave where the address space of a memory for the secure enclave that is loading or storing the data for the secure enclave may be protected from access by an entity that is not the processor. Thus, the designation of a secure enclave to the self-encrypting key management service may allow access to the data of the self-encrypting key management service by a hardware-based access of the processor (e.g., by using the set of instructions) as opposed to an access by an operating system or another application of the network server.

The self-encrypting key management service may receive cryptographic keys from one or more applications so that the cryptographic keys may be securely stored in the secure enclave that is accessible by the processor. For example, a cryptographic key for an application that is not assigned to a secure enclave or is assigned to a different secure enclave may be stored in the secure enclave of the self-encrypting key management service. The cryptographic keys, or other such data received from an application, may be encrypted in the address space of a memory that is assigned to the secure enclave of the self-encrypting key management service. In some embodiments, the cryptographic keys may be encrypted by or based on an internal key stored within the processor (e.g., the internal key is stored within the hardware or silicon of the processor). In operation, the self-encrypting key management service may be assigned a secure enclave and may subsequently receive a cryptographic key from another application. The cryptographic key may be encrypted by the processor when received by the self-encrypting key management service and stored in the address space of the memory assigned to the secure enclave of the self-encrypting key management service. Subsequently, the application may transmit a request for the self-encrypting key management service to perform a cryptographic operation with the cryptographic key that was previously received from the application. In response, the self-encrypting key management service may transmit a request to the processor that may use its internal key to decrypt data of the secure enclave corresponding to the self-encrypting key management service. The cryptographic operation may then be performed with the cryptographic key that was previously received by the application.

Thus, the use of the self-encrypting key management service may result in additional space in a data center or a network cluster as a physical computing device to provide cryptographic operations may be removed as the self-encrypting key management service may be hosted or provided by another network server. An additional advantage of the present disclosure, in certain embodiments, is that the cryptographic operations may be performed in less time as network latency may not result in additional time to perform the cryptographic operation since the self-encrypting key management service may be hosted by the same network server that is also hosting the application so that transmitting data over a network may not be needed. Furthermore, the data or information received from other applications to be securely stored and managed by the self-encrypting key management service by using the secure enclave provided by the processor.

The self-encrypting key management service may run on the same hardware (e.g., a server) as a user application making use of the self-encrypting key management service. Thus, another advantage of the present disclosure is saving of physical space, cost, power, operational cost, and real estate in a data center. By combining the self-encrypting key management service with a user application on the same hardware, the present disclosure reduces a hardware footprint and allows customers to use a fewer number of server racks and operate in congested environment.

Another advantage of the present disclosure is that the communication between the self-encrypting key management service and the user application is local and is not transmitted from the hardware (e.g., the server providing the self-encrypting key management service). Therefore, a customer of the present disclosure may continue to operate even when local network connectivity is disrupted.

FIG. 1 illustrates an example environment 100 to provide secure key management for applications. The environment 100 may correspond to a network server that includes a processor 110 and hosts or provides a self-encrypting key management service 120 and one or more applications 130.

As shown in FIG. 1, the environment 100 may correspond to a network server of a network cluster and includes a processing device 110 that executes a self-encrypting key management service 120. As previously described, the self-encrypting key management service 120 may be assigned or designated to a secure enclave by the processing device 110 so that data of the self-encrypting key management service 120 may not be read from or written to external to the secure enclave. Thus, the self-encrypting key management service 120 may be executed by the processor 110 and may be assigned a secure enclave that is associated with the processor 110. The network server that is hosting the self-encrypting key management service may further provide or host one or more applications 130. For example, the network server may host or provide additional applications that use a cryptographic operation.

As described in further detail below, the one or more applications 130 may each provide a cryptographic key to the self-encrypting key management service 120 to securely store and manage the respective cryptographic keys of the applications. Since the self-encrypting key management service 120 is assigned to a secure enclave by the processor 110, the cryptographic keys that are received by the self-encrypting key management service 120 may be stored in the secure enclave of the self-encrypting key management service 120 so that the processor 110 may encrypt the cryptographic keys based on another key that is internal to the processor 110 and is specified by hardware characteristics or features of the processor 110. Furthermore, the one or more applications 130 may provide a request to use a cryptographic operation with a particular cryptographic key that is stored in the secure enclave of the self-encrypting key management service 120. In response, the self-encrypting key management service 120 may provide a request to the processor 110 to decrypt the data of its secure enclave that includes the particular cryptographic key that was previously received. Subsequently, the cryptographic operation may be performed with the particular cryptographic key and the processor 110 may provide a result to the self-encrypting key management service 120 which may then provide the result to the application.

Figure 2:
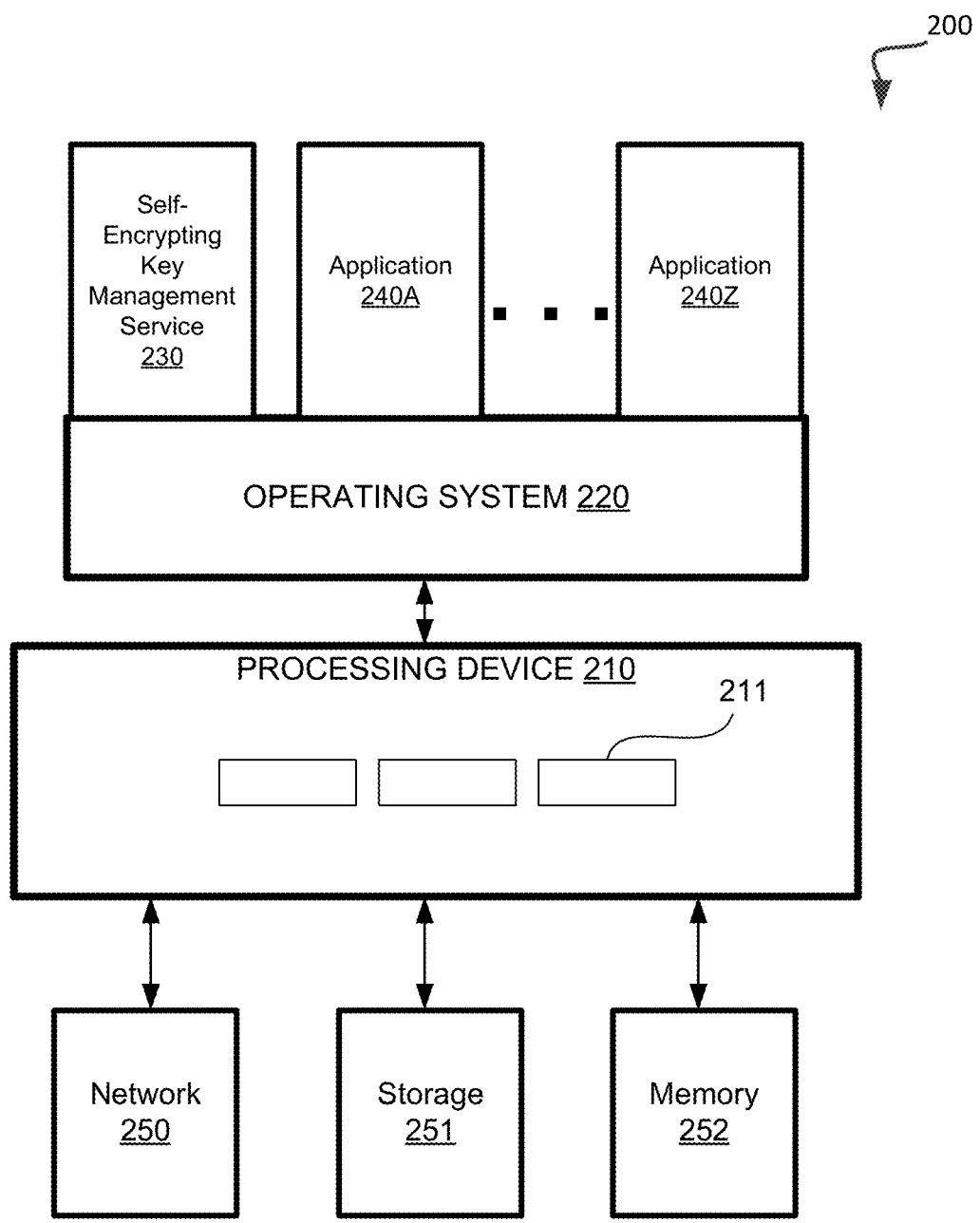
FIG. 2 illustrates an example network server with a self-encrypting key management service to provide secure key management for applications in accordance with some embodiments of the present disclosure.

FIG. 2 illustrates an example network server 200 with a self-encrypting key management service to provide secure key management for applications. In general, a self-encrypting key management service 230 may be hosted by a network server to provide secure key management for one or more other applications 240A to 240Z that are also hosted by the network server. The self-encrypting key management service 230 may correspond to the self-encrypting key management service 120 of FIG. 1, the applications 240A to 240Z may correspond to the one or more applications 130 of FIG. 1, and the processing device 210 may correspond to the processor 110 of FIG. 1.

As shown in FIG. 2, the network server 200 may include a processing device 210 that may execute an operating system 220. Furthermore, the processing device 210 may include one or more internal cryptographic keys 211 that may be used to encrypt and decrypt data stored in a portion of a memory that is assigned to a secure enclave of the self-encrypting key management service 230. As previously described, the access to the data of the self-encrypting key management service 230 in the secure enclave may be protected from the one or more applications 240A to 240Z and the operating system 220. For example, the access to the data of the secure enclave corresponding to the self-encrypting key management service 230 may be protected by the use of one of the internal cryptographic keys 211 that are internal to the processing device 210 so that the access to the data is based on a hardware access as opposed to a software access. The operating system 220 may be associated with a first privilege level and the self-encrypting key management service 230 and the applications 240A to 240Z may be associated with a second privilege level where the first privilege level of the operating system is more privileged than the second privilege level of the various applications that are run on the operating system 220 (e.g., the more privileged level allows access to more resources of the network server than the less privileged level). Thus, the operating system 220 may be allowed access to resources of the applications 240A to 240Z. However, since the self-encrypting key management service 230 is assigned to a secure enclave where access to the data of the secure enclave is based on the use of an internal cryptographic key 211 of the processing device 211, the operating system 220 may not be able to access the data of the self-encrypting key management service 230 despite having a more privileged level of access than the self-encrypting key management service 230.

In operation, the self-encrypting key management service 230 may be hosted on the network server 200 with the applications 240A to 240Z. The application 240A may perform a function that may use a cryptographic operation with a cryptographic key. In order to securely store the cryptographic key and perform the cryptographic operation securely, the application 240A may establish a connection with the self-encrypting key management service 230. For example, an attestation procedure may be performed by the application 240A to authenticate the self-encrypting key management service 230. After the self-encrypting key management service 230 has been authenticated, a connection may be considered to be established between the application 240A and the self-encrypting key management service 230. The cryptographic key of the application 240A (e.g., used by cryptographic operation) may be provided to the self-encrypting key management service 230. Since the self-encrypting key management service 230 is assigned to a secure enclave, the data of the self-encrypting key management service 230 may be encrypted and protected by the use of an internal cryptographic key 211 (i.e., an internal key) of the processing device 210. For example, the self-encrypting key management service 230 may receive the cryptographic key of the application 240A and may transmit an instruction to the processing device 210 to store the received cryptographic key in the memory of its assigned secure enclave. In some embodiments, the self-encrypting key management service 230 may transmit identification information of the self-encrypting key management service 230 to the processing device 210 for the processing device 210 to load the received cryptographic key from the application 240A in the secure enclave of the self-encrypting key management service 230. The processing device 230 may use an instruction to use one of its internal cryptographic keys 211 that is based on the identification of the self-encrypting key management service 230 to store the received cryptographic key in the memory of the secure enclave of the self-encrypting key management service 230. For example, the received cryptographic key may be securely (e.g., encrypted) stored in the storage 251 or memory 252 associated with the processing device 210 or at another storage resource over a network 250. In some embodiments, one of the applications 240A to 240Z may provide a request to the self-encrypting key management service 230 to generate a cryptographic key to be used in a cryptographic operation for the respective application 240A to 240Z. For example, the self-encrypting key management service 230 may generate the cryptographic key and may store the cryptographic key in its memory of the secure enclave.

After the cryptographic key of the application 240A has been loaded in the secure enclave, the application 240A may subsequently request for a cryptographic operation to be performed with its cryptographic key. For example, the application 240A may provide a request to the self-encrypting key management service 230 that identifies the cryptographic operation to be performed. The self-encrypting key management service 230 may subsequently use an instruction so that the processing device 210 may use one of its internal cryptographic keys 211 that is based on the identification of the self-encrypting key management service 230 to decrypt the data of the secure enclave of the self-encrypting key management service 230 and to retrieve the cryptographic key. Subsequently, the cryptographic operation may then be performed (e.g., data may be decrypted or data may be signed by using the retrieved cryptographic key) by the processing device 210 and then the output of the cryptographic operation may be provided to the self-encrypting key management service 230 which may return the output to the application 240A. In some embodiments, the internal cryptographic key 211 may be combined with additional information (e.g., the identification information of the self-encrypting key management service 230) to generate a secure enclave key for the self-encrypting key management service 230 that is used to decrypt and/or encrypt data associated with the secure enclave of the self-encrypting key management service 230. Thus, since the processing device 210 uses its internal cryptographic key 211 to decrypt data and to perform the cryptographic operation, the cryptographic key received from the application may not be exposed external to the processing device 210.

In the same or alternative embodiments, a particular application may further request to be assigned a secure enclave. For example, the application may transmit a request to the self-encrypting key management service 230 to provide an instruction to the processing device 210 to assign another secure enclave to the application. In such an case, another internal cryptographic key 211 or another secure enclave key may be generated (e.g., based on the same or other internal cryptographic key 211 and identification information of the application requesting to be assigned a secure enclave) by the processing device 210 to manage the memory for the other secure enclave.

As such, a network server may run a self-encrypting key management service and an application that may use the self-encrypting key management service for storing or loading keys and managing the use of the keys. Although FIG. 2 illustrates that the self-encrypting key management service 230 may provide secure key management for an application 240A to 240Z on the same network server, the self-encrypting key management service 230 may alternatively be hosted by another network server as described in further detail below or may be hosted by another network server that is external to any data center or network cluster that includes the network servers hosting applications 240A to 240Z.

Figure 3:
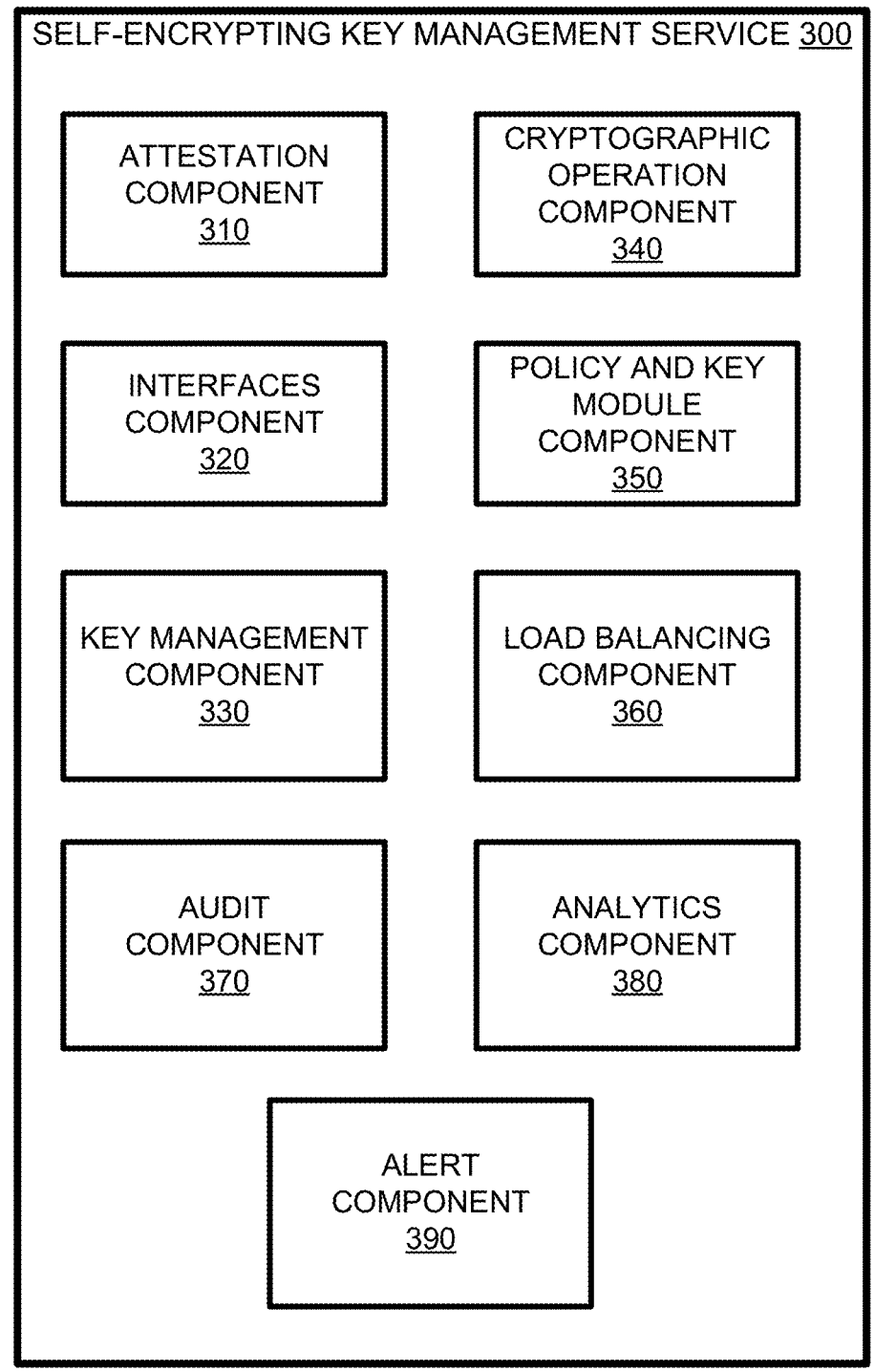
FIG. 3 is a block diagram of a self-encrypting key management service in accordance with some embodiments.

FIG. 3 is a block diagram of a self-encrypting key management service 300. In general, the self-encrypting key management service 300 may correspond to the self-encrypting key management service 120 of FIG. 1 or the self-encrypting key management service 230 of FIG. 2. The self-encrypting key management service 300 may include an attestation component 310, an interfaces component 320, a key management component 330, cryptographic operation component 340, policy and key module component 350, an authentication component 360, an audit component 370, an analytics component 380, and an alert component 390. In the same or alternative embodiments, the functionalities of multiple components may be combined or the functionality of one of the components may be divided into additional components.

As shown in FIG. 3, the self-encrypting key management service 300 may include an attestation component 310 that may be used to perform an authentication procedure of the self-encrypting key management service 300. In some embodiments, an application that attempts to establish a connection with the self-encrypting key management service 300 may include the attestation component 310. Furthermore, the attestation component 310 may be used to authenticate the self-encrypting key management service 300 to the other application. Further details with regards to the attestation or authentication procedure are described in conjunction with FIG. 5.

The interfaces component 320 may provide one or more interfaces for applications to interact with the self-encrypting key management service 300. The interfaces may be an application programming interface (API) that is used to interact with cryptographic keys, digital certificates, etc. Thus, the various interfaces may define functions (e.g., inputs and a defined output) to create or generate a cryptographic key, modify data by using a cryptographic key, encrypt data with a cryptographic key, decrypt data with a cryptographic key, provide a digital signature with a cryptographic key, verify a digital signature with a cryptographic key, delete a cryptographic key, perform a key wrapping operation with at least two cryptographic keys, or any other cryptographic operation. The interfaces may be, but are not limited to, Public-Key Cryptography Standards (PKCS) #11 or the Key Management Interoperability Protocol (KMIP). In some embodiments, the interfaces may include a representational state transfer (REST) interface to select the various functions that are provided by the self-encrypting key management service 300.

Referring to FIG. 3, the self-encrypting key management service 300 may include a key management component 330 that may be used to access keys loaded in a secure enclave of the self-encrypting key management service 300. For example, the keys may be accessed and used in a cryptographic operation for another application. Further details with regards to the key management and accessing keys are described in conjunction with FIG. 4. Furthermore, the cryptographic operation component 340 may provide an instruction to perform a cryptographic operation with an accessed key. Further details with regard to performing a cryptographic operation are described in conjunction with FIG. 4.

Figure 7:
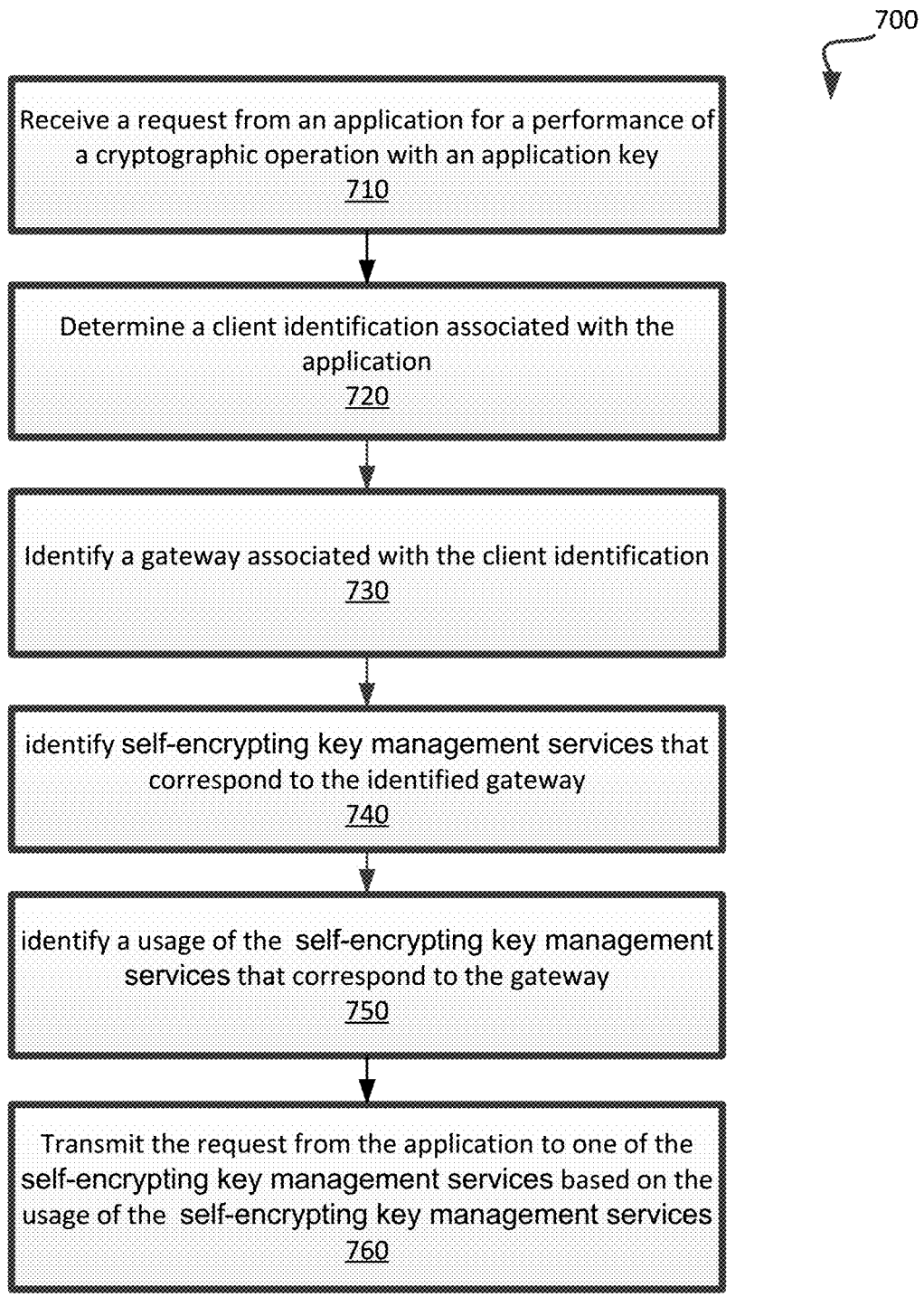
FIG. 7 illustrates a flow diagram of an example method to provide load balancing for self-encrypting key management services in accordance with some embodiments of the present disclosure.
Figure 8:
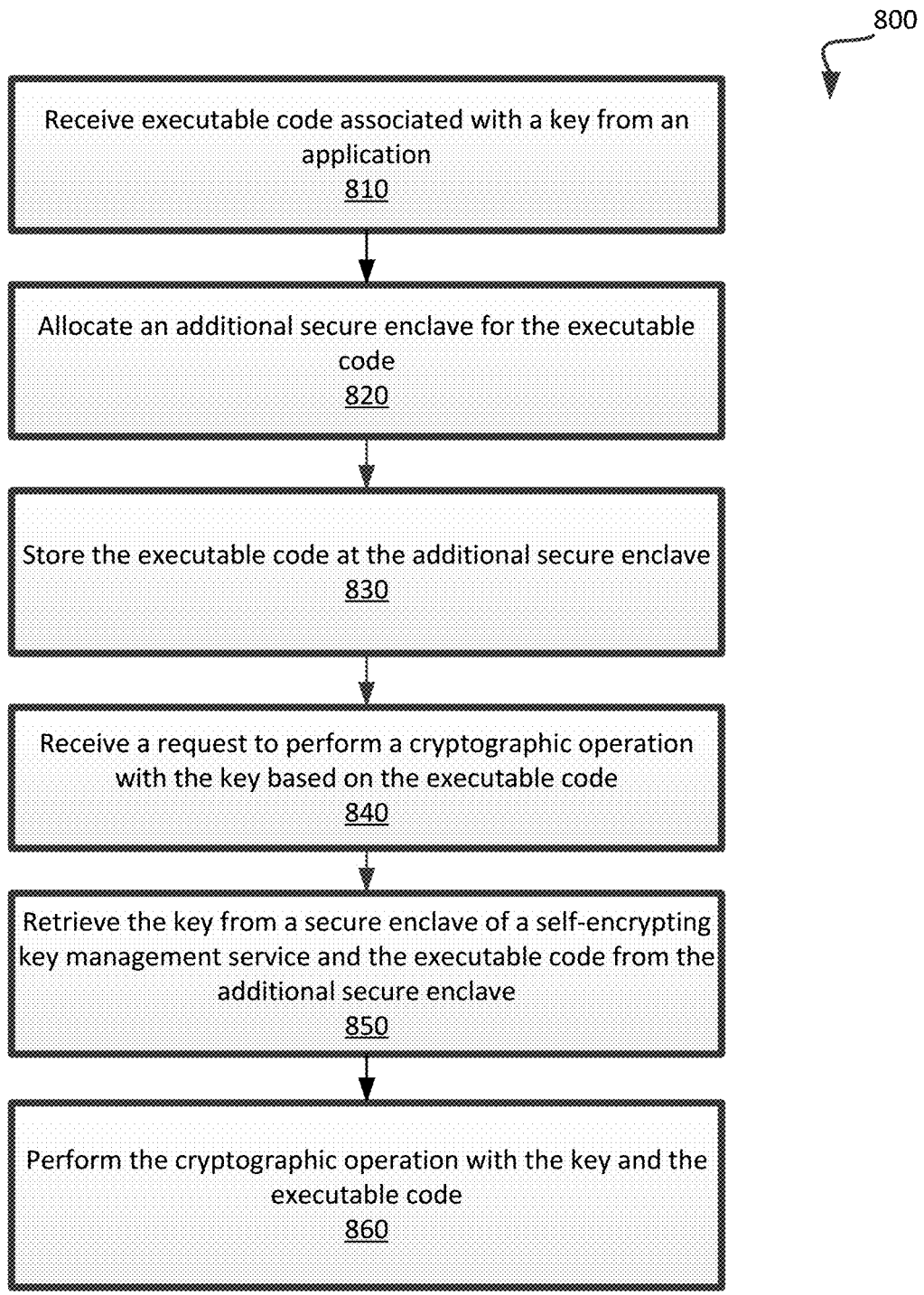
FIG. 8 illustrates a flow diagram of an example method to receive executable code associated with a key in accordance with some embodiments of the present disclosure.

The self-encrypting key management service 300 may include a policy and key module component 350 to receive instructions to set one or more policies on one or more keys or to receive executable code associated with one or more keys as described in further detail in conjunction with FIG. 8. An authentication component 360 may be used to provide authentication for user logins, passwords, or single sign on (SSO) credentials for using cryptographic or key management operations provided by the self-encrypting key management service 300. In some embodiments, a load balancing component 360 may provide a load balancing operation between multiple self-encrypting key management services across multiple network servers of a network cluster. In the same or alternative embodiments, the load balancing component 360 may be provided externally from the self-encrypting key management service 300 (e.g., at an application 240A to 240Z of FIG. 2). Further details with regard to the load balancing operation are described in conjunction with FIGS. 6-7.

The self-encrypting key management service 300 may further include an audit component 370 to provide auditing of various actions. For example, the audit component may provide a secure verification of the history of a set of selectable actions performed by the self-encrypting key management service 300 (e.g., which cryptographic operations have been performed for a particular user). The result of the audit may be transmitted to a remote party. The analytics component 380 may provide a secure processing of various data contained in the self-encrypting key management service 300 to create a specific result without revealing all the data that has been processed. Furthermore, the alert component 390 may provide a notification to a remote user when a particular action is performed by or within the self-encrypting key management service 300 (e.g., the creation of a key, a key being used multiple times beyond a certain set threshold, etc.).

Figure 4:
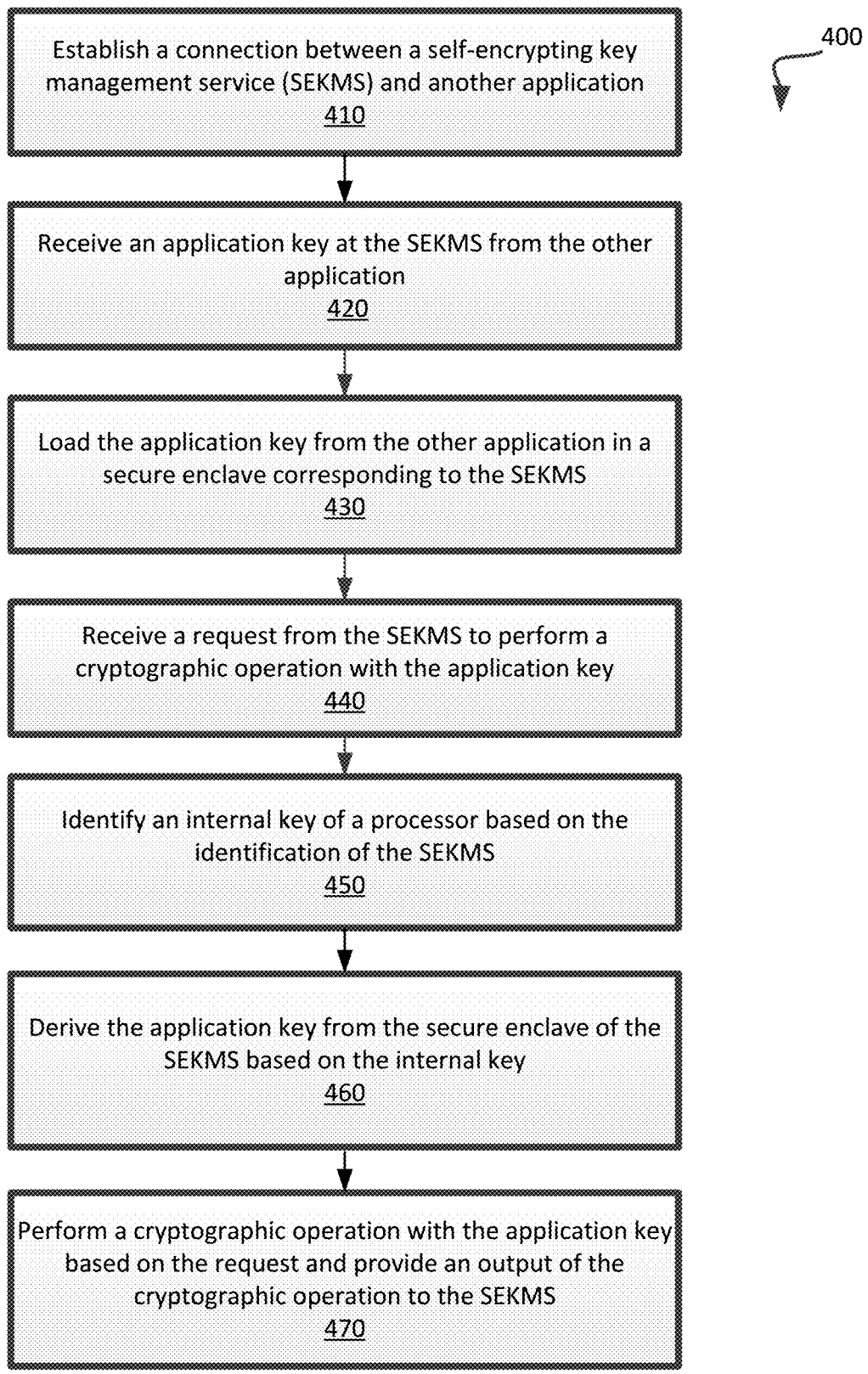
FIG. 4 illustrates a flow diagram of an example method to provide an output from the self-encrypting key management service based on a cryptographic operation in accordance with some embodiments of the present disclosure.

FIG. 4 illustrates a flow diagram of an example method 400 to provide an output from the self-encrypting key management service based on a cryptographic operation. In general, the method 400 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 may be performed by the self-encrypting key management service 120 of FIG. 1, the self-encrypting key management service 230 of FIG. 2, or the self-encrypting key management service 300 of FIG. 3.

As shown in FIG. 4, the method 400 may begin with the processing logic establishing a connection between a self-encrypting key management service and another application (block 410). The connection may be established after an attestation procedure successfully authenticates the self-encrypting key management service to the other application. Furthermore, the self-encrypting key management service and the other application may be provided on the same network server. In the same or alternative embodiments, the self-encrypting key management service and the other application may be provided on different network servers. Thus, the self-encrypting key management service may be considered another application that is provided on the same or different network server. The processing device may further receive an application key from the other application at the self-encrypting key management service (block 420). The application key may be considered a cryptographic key of the other application. In some applications, the application key may be generated by the self-encrypting key management service in response to a request from the other application to generate the application key. Furthermore, the application key may be a key that is to be loaded in a secure enclave corresponding to the self-encrypting key management service. The processing logic may further load the application key from the other application in a secure enclave corresponding to the self-encrypting key management service (block 430). For example, the application key may be stored or loaded in a memory or address space of a memory that is assigned to the self-encrypting key management service. The data in the memory or address space may be encrypted by a processor as previously described. For example, the processor may retrieve the encrypted data from the memory corresponding to the secure enclave, store the encrypted data in an internal memory of the processor, decrypt the data, insert the application key into the decrypted data, and then subsequently encrypt the data with the inserted application key based on an internal key and store the now encrypted data with the application key into the same address space or memory corresponding to the secure enclave of the self-encrypting key management service.

The processing logic may further receive a request from the self-encrypting key management service to perform a cryptographic operation with the application key (block 440). For example, the other application may provide a request to the self-encrypting key management service where the request identifies a type of cryptographic operation by using an interface of the self-encrypting key management service. The request may further identify the application key from multiple application keys of the other application that are loaded in the secure enclave corresponding to the self-encrypting key management service. The cryptographic operation may be to decrypt data, generate a signature for data (e.g., a message), etc. In such a case, the request from the application may include or identify the data that is to be performed with the cryptographic operation and the application key. The processing logic may further identify an internal key of a processor based on the identification of the self-encrypting key management service (block 450). The internal key of the processor may be one of multiple internal keys that are stored within the processor or may be based on an internal key and additional information (e.g., an identification of the self-encrypting key management service). For example, a secure enclave key of the self-encrypting key management service may be generated by using a combination of the internal key that is stored within the processor and a hash value that is generated by performing a hash function with the code of the self-encrypting key management service. In the same or alternative embodiments, the secure enclave key may be generated based on a combination of the internal key and an identification of the self-encrypting key management service that is included in the request from the self-encrypting key management service to perform the cryptographic operation. The secure enclave key may be assigned to a secure enclave that corresponds to the self-encrypting key management service. The processing logic may subsequently derive the application key from the secure enclave of the self-encrypting key management service based on the internal key (block 460). For example, the data in a portion of a memory assigned to the secure enclave of the self-encrypting key management service may be decrypted by the internal key (or secure enclave key that is derived from the internal key) of the processor and the application key may be retrieved from the decrypted data by the processor. The data may be decrypted by the processor within an internal memory (e.g., a cache memory) of the processor. Subsequently, the processing logic may perform a cryptographic operation with the application key based on the request and provide an output of the cryptographic operation to the self-encrypting key management service (block 470). For example, the processor may perform the cryptographic operation with the application key as the application key is stored within the internal memory of the processor. For example, the cryptographic operation may be performed with the application key and data identified by or included in the request. Subsequently, the self-encrypting key management service may provide the output of the cryptographic operation to the other application.

Figure 5:
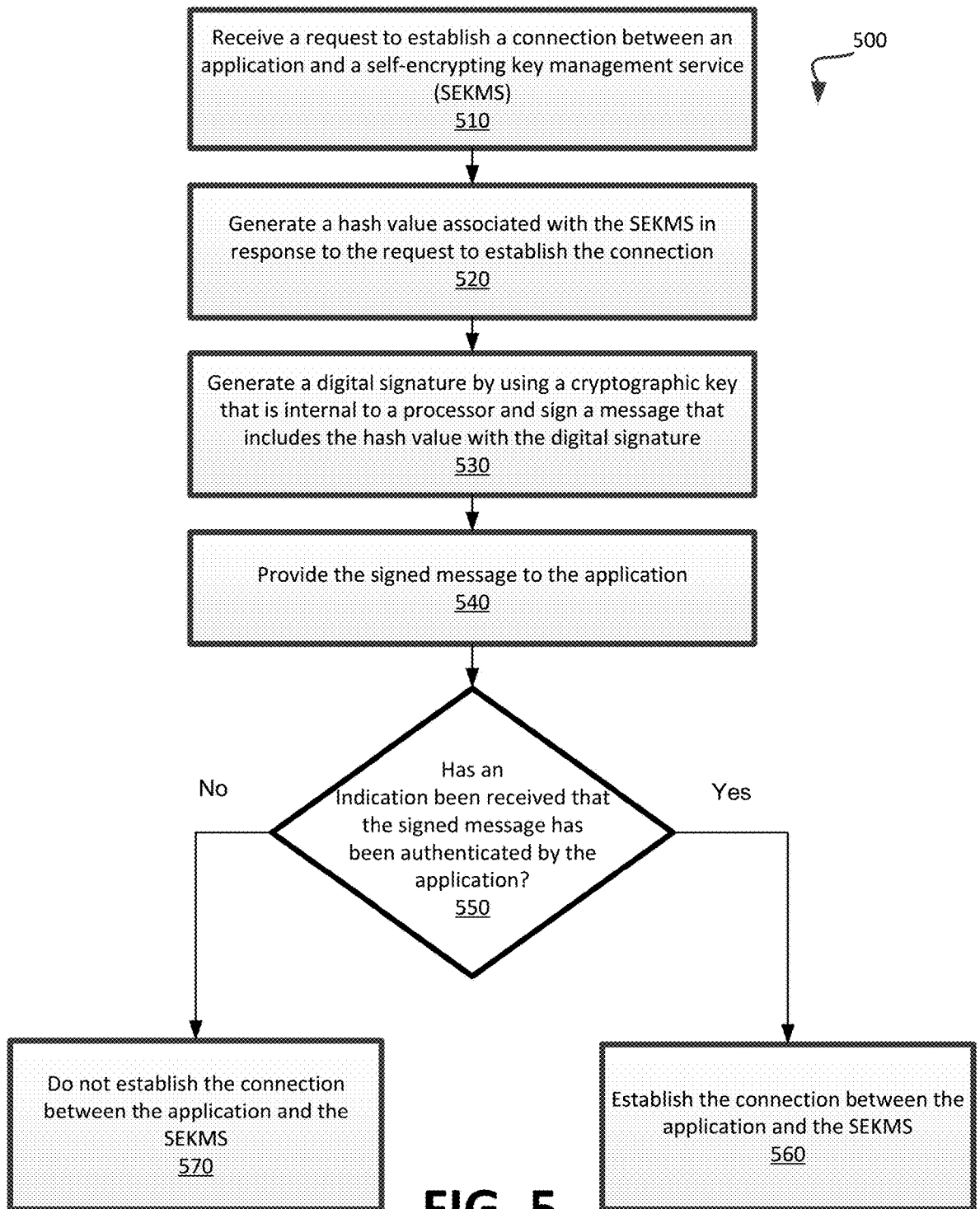
FIG. 5 illustrates a flow diagram of an example method to perform an authentication of a self-encrypting key management service in accordance with some embodiments of the present disclosure.

FIG. 5 illustrates a flow diagram of an example method 500 to perform an authentication of a self-encrypting key management service. In general, the method 500 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 may be performed by the self-encrypting key management service 120 of FIG. 1, the self-encrypting key management service 230 of FIG. 2, or the self-encrypting key management service 300 of FIG. 3.

As shown in FIG. 5, the method 500 may begin with the processing logic receiving a request to establish a connection between an application and a self-encrypting key management service (block 510). The request may be received from the application on a network server to the self-encrypting key management service that is hosted on the same network server or a different network server. In some embodiments, the connection between the application and the self-encrypting key management service may be to provide an application key from the application to be loaded in a secure enclave of the self-encrypting key management service. The processing logic may further generate a hash value associated with the self-encrypting key management service in response to the request to establish the connection (block 520). For example, a processor may generate or calculate the hash value of the self-encrypting key management service by using a hash function that maps data of an arbitrary size (e.g., the programming code of the self-encrypting key management service) to data of a fixed size (e.g., the hash value). The processing device may further generate a digital signature by using a cryptographic key that is internal to a processor and sign a message that includes the hash value with the digital signature (block 530). The signed message may include identification information of the processor and/or the self-encrypting key management service. Subsequently, the processing logic may provide the signed message to the application (block 540). For example, the message that includes the hash value of the self-encrypting key management service and that has been signed may be provided to the application that has requested to establish the connection between the application and the self-encrypting key management service.

Furthermore, the processing logic may determine whether an indication that the self-encrypting key management service has been authenticated by the application by using the signed message has been received (block 550). For example, the application may provide an indication that the self-encrypting key management service has been successfully authenticated if the cryptographic hash included in the signed message corresponds or is equal to another cryptographic hash used by the application to compare with the cryptographic hash from the signed message. Furthermore, the application may verify the signature of the processor that is included with the message by using a corresponding public key to verify that the signature was generated by the internal private key of the processor. If the processing logic receives an indication that the self-encrypting key management service has been authenticated, then the processing logic may establish the connection between the application and the self-encrypting key management service (block 560). For example, a cryptographic key may be allowed to be transmitted or provided from the application to the self-encrypting key management service to be loaded within the secure enclave of the self-encrypting key management service. However, if the processing logic does not receive an indication that the self-encrypting key management service has been authenticated, then the processing logic may not establish the connection between the application and the self-encrypting key management service (block 570). For example, the cryptographic key from the application may not be allowed to be transmitted or provided to the self-encrypting key management service. The authentication process may be repeated for each application that provides a key to the self-encrypting key management service. In some embodiments, the authentication process may be repeated for an application for each time that the application requests to use an operation provided by the self-encrypting key management service.

Figure 6:
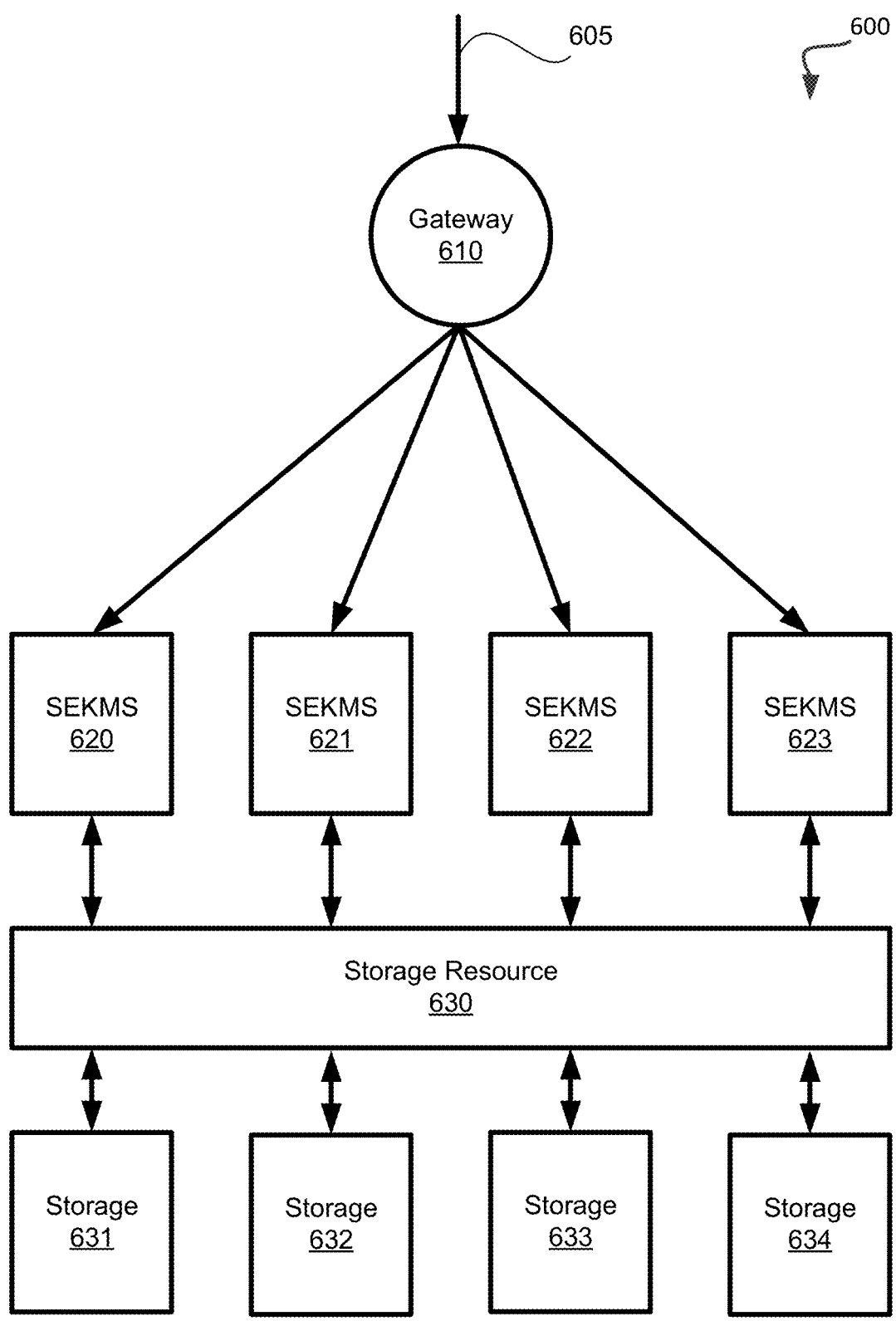
FIG. 6 illustrates a block diagram of a distributed environment 600 with multiple self-encrypting key management services to provide load balancing for cryptographic operations in which some embodiments of the disclosure may operate.

FIG. 6 illustrates a block diagram of a distributed environment 600 with multiple self-encrypting key management services to provide load balancing for cryptographic operations. In general, the distributed environment 600 may include multiple self-encrypting key management services 620, 621, 622, and 623 that may each correspond to the self-encrypting key management service 120 of FIG. 1, the self-encrypting key management service 230 of FIG. 2, or the self-encrypting key management service 300 of FIG. 3.

As shown in FIG. 6, the distributed environment 600 may include a gateway 610, self-encrypting key management services 620, 621, 622, and 623, and a shared storage resource 630. Each of the gateway 610 and self-encrypting key management services 620, 621, 622, and 623 may be included on separate network servers of a network cluster. In some embodiments, the gateway 610 may be hosted by a network server that also hosts one of the self-encrypting key management services 620, 621, 622, and 623. The gateway 610 may receive a request 605 from an application that is hosted by a network server of the same network cluster that includes the gateway 610. The request 605 may correspond to a request to perform a cryptographic operation with an application key that is stored at the shared storage resource 630. The gateway 610 may include one or more interfaces (e.g., PKCS11, KMIP, a REST interface, etc.) that may be used by an application to provide data to the gateway (e.g., data to be decrypted or signed) so that the request and the data may be relayed or directed to one of the self-encrypting key management services.

The self-encrypting key management services 620, 621, 622, and 623 may each be associated with the same shared storage resource 630. For example, each of the self-encrypting key management services 620, 621, 622, and 623 may be associated with a different secure enclave that corresponds to the shared storage resource 630 that is supported by storages 631, 632, 633, and 634 (e.g., a SEKMS and a storage component may correspond to a separate server). Each of the self-encrypted key management services may provide a communication to another self-encrypted key management service to provide data or cryptographic keys. For example, a cryptographic key may be securely stored at a secure enclave associated with a first self-encrypting key management service and when a second self-encrypting key management service is created or instantiated, then the cryptographic key may be securely provided from the first self-encrypting key management service to the second self-encrypting key management service. As such, a common cryptographic key may be securely stored at each of the different secure enclaves associated with each of the self-encrypting key management services. Thus, a cryptographic key (e.g., an application key from another application hosted on a network server) that is received by the self-encrypting key management services may be stored in the same portion of a memory corresponding to the same secure enclave for the self-encrypting key management service.

In operation, the gateway 610 may receive a request from an application to use a particular application key stored in the secure enclave corresponding to self-encrypting key management services at the shared storage resource 630 in a cryptographic operation with data from the application. The gateway 610 may use a policy to determine which of the self-encrypting key management services 620, 621, 622, and 623 that the request including the data and identification of the cryptographic operation and particular application key should be transmitted. Further details with regard to the policy are described in conjunction with FIG. 7. In response to the policy, the gateway 610 may transmit the request to a particular self-encrypting key management service. As each of the self-encrypting key management services 620, 621, 622, and 623 correspond to the same secure enclave and the same identification information, a processor on the respective network server may utilize an internal key corresponding to the secure enclave to access data of the secure enclave at the shared storage resource 630 that stores the application key corresponding to the request from the gateway. Furthermore, the distribution of the self-encrypting key management services 620, 621, 622, and 623 on different servers may provide high availability of the self-encrypting key management service as when one of the servers hosting or providing a particular self-encrypting key management service is offline or not functional, then the gateway may transmit the request to another self-encrypting key management service on a server that is currently functional.

FIG. 7 illustrates a flow diagram of an example method 700 to provide load balancing. In general, the method 700 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 may be performed by the self-encrypting key management service 120 of FIG. 1, the self-encrypting key management service 230 of FIG. 2, the self-encrypting key management service 300 of FIG. 3, or the gateway 610 of FIG. 6.

As shown in FIG. 7, the method 700 may begin with the processing logic receiving a request from an application for a performance of a cryptographic operation with an application key (block 710). For example, a gateway associated with one or more self-encrypting key management services that provide secure key management for the application on a network server may receive the request from the application. The processing logic may further determine a client identification associated with the application (block 720). For example, a network cluster with multiple network servers may provide secure key management for applications that are operated by or associated with multiple different clients or users. The client identification may be specified in the request. The client identification may identify a user of the application. The processing logic may subsequently identify a gateway associated with the client identification (block 730). For example, the network cluster may include multiple gateways where each gateway is assigned to at least one client identification. Thus, a particular gateway out of multiple gateways at different network servers of the network cluster that matches with the client identification may be received. The processing logic may subsequently identify self-encrypting key management services that correspond to the identified gateway (block 740). For example, the self-encrypting key management services that are relayed or transmitted requests from the gateway may be identified. Each of the self-encrypting key management services may be associated with a same secure enclave. The processing logic may further identify a usage of the self-encrypting key management services that correspond to the identified gateway (block 750). For example, a number of cryptographic operations for other applications that are being performed by each of the self-encrypting key management services may be identified. In some embodiments, a number of cryptographic operations that have been performed within a threshold period of time may be identified. In the same or alternative embodiments, the number of applications that have requested a performance of a cryptographic operation that have been provided from the gateway to each respective self-encrypting key management services may be received. The processing logic may subsequently transmit the request from the application to one of the self-encrypting key management services based on the usage of the self-encrypting key management services (block 760). For example, the self-encrypting key management service that is least used may receive the request from the gateway. The self-encrypting key management service that is providing the least number of cryptographic operations or that has provided cryptographic operations for the least number of applications over a threshold period of prior time may receive the request from the gateway.

In the same or alternative embodiments, other such metrics may be used to relay or transmit a request from an application to one of the self-encrypting key management services associated with a gateway. For example, a round robin scheme may be used to relay or transmit the requests from applications to the self-encrypting key management services. The requests may be transmitted based on a location of a network server that provides or hosts the application providing the request and the location of another network server that hosts a self-encrypting key management service that is nearest to the network server that hosts or provides the application. In some embodiments, a determination may be made as to whether a network server that is currently hosting or providing the application is also hosting a self-encrypting key management service. If so, then the request from the application may be transmitted to the self-encrypting key management service on the same network server. Otherwise, if the network server does not host a self-encrypting key management service, then the request may be transmitted to the gateway and the request may be transmitted or relayed based on one of the processes as described above. In some embodiments, a request from an application may be transmitted or relayed to one of the self-encrypting key management services based on an amount of processing or computing power that corresponds to the application. For example, the application may require a threshold amount of processing or computing capability to provide cryptographic operations that are to be performed by a self-encrypting key management service. A first self-encrypting key management service may have a lower amount of processing or computing capability that is lower than the threshold and a second self-encrypting key management service may have a higher amount of processing or computing capability that satisfies or exceeds the threshold. The request from the application may thus be transmitted or relayed to the second self-encrypting key management service as opposed to the first self-encrypting key management service.

Thus, the self-encrypting key management services may be distributed across multiple network servers to provide secure key management for applications across the network servers. The distributed environment may allow additional self-encrypting key management services to be added (e.g., by adding a new network server to the network cluster to provide a new instance of the self-encrypting key management service) to improve the performance of the network cluster to provide secure key management to the applications.

FIG. 8 illustrates a flow diagram of an example method to receive executable code associated with a key. In general, the method 800 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 800 may be performed by the self-encrypting key management service 120 of FIG. 1, the self-encrypting key management service 230 of FIG. 2, or the self-encrypting key management service 300 of FIG. 3.

As shown in FIG. 8, the method 800 may begin with the processing logic receiving executable code associated with a key from an application (block 810). The executable code may be programming code that is used with an x86 processor instruction set. The executable code may specify one or more operations to be performed with the key and/or additional keys. For example, the executable code may specify a series of operations to perform a key wrapping function based on multiple cryptographic operations using the key and an additional key. The processing logic may further allocate an additional secure enclave for the executable code (block 820). For example, another portion of a memory may be assigned to the executable code where the memory also provides a secure enclave for a self-encrypting key management service to another portion of the memory. The processing logic may subsequently store the executable code at the additional secure enclave (block 830). For example, another internal key of a processor may be used to store the executable code at the additional secure enclave. The processing logic may later receive a request to perform a cryptographic operation with the key based on the executable code (block 840). For example, the request may be received from the application that provided the executable code. Subsequently, the processing logic may retrieve the key from a secure enclave of a self-encrypting key management service and the executable code from the additional secure enclave (block 850). For example, a first secure enclave key for the secure enclave of the self-encrypting key management service may be generated as previously described to access the data of the secure enclave of the self-encrypting key management service and a second secure enclave key for the additional secure enclave of the executable code may be generated. The second secure enclave key may be generated based on the internal key of the processor that is combined with identification information of the application that has provided the executable code. Subsequently, the processing logic may perform the cryptographic operation with the key and the executable code (block 860). The output of the cryptographic operation may then be provided to the self-encrypting key management service which may further provide the output to the application.

In some embodiments, the application may provide additional executable code to the self-encrypting key management service to be stored in the additional secure enclave. Thus, the additional secure enclave may include multiple distinct executable code that may be separately identified in a request to provide a cryptographic operation.

Figure 9:
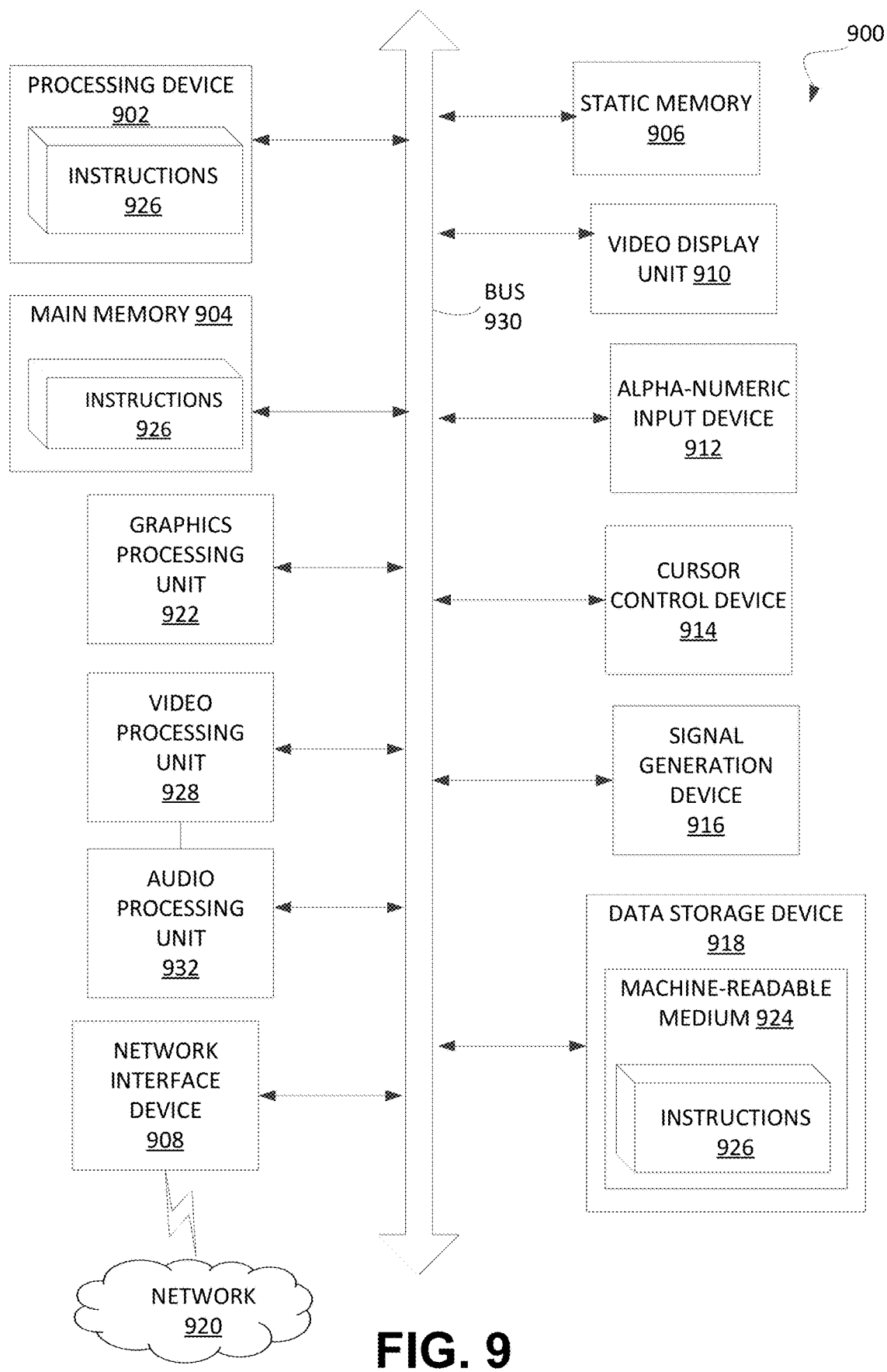
FIG. 9 illustrates an example computer system in which embodiments of the present disclosure operate.

FIG. 9 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a data storage device 918, which communicate with each other via a bus 930.

Processing device 902 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 is configured to execute instructions 926 for performing the operations and steps discussed herein.

The computer system 900 may further include a network interface device 908 to communicate over the network 920. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable storage medium 924 (also known as a computer-readable medium) on which is stored one or more sets of instructions or software 926 embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting machine-readable storage media.

In one implementation, the instructions 926 include instructions to implement functionality corresponding to a self-encrypting key management service (e.g., self-encrypting key management service 120, 230, and 300 of FIGS. 1-3). While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method comprising:
    receiving, from an application, a request to perform a cryptographic operation with a specified application key, wherein the application is associated with a client identification;
    identifying a gateway associated with the client identification;
    identifying, by a processing device, a respective characteristic of each self-encrypting key management service of a plurality of self-encrypting key management services that correspond to the gateway, wherein each of the plurality of self-encrypting key management services is associated with a respective secure enclave of a plurality of secure enclaves, wherein the specified application key is encrypted at each of the plurality of secure enclaves by a respective secure enclave key of a plurality of secure enclave keys, and wherein the specified application key is stored in a shared storage resource accessible by each of the plurality of self-encrypting key management services;
    identifying a self-encrypting key management service of the plurality of self-encrypting key management services, wherein a characteristic of the identified self-encrypting key management service satisfies a threshold criterion; and
    sending the request to the identified self-encrypting key management service, wherein the request identifies, using an interface of the self-encrypting key management service, a type of cryptographic operation to be performed by a cryptographic operation component of the self-encrypting key management service.

2. The method of claim 1, wherein the characteristic of the identified self-encrypting key management service comprises a number of cryptographic operations for one or more other applications that are being performed by the identified self-encrypting key management service.

3. The method of claim 1, wherein the characteristic of the identified self-encrypting key management service comprises a number of cryptographic operations that have been performed within a threshold period of time.

4. The method of claim 1, wherein the characteristic of the identified self-encrypting key management service comprises a number of applications from which at least one request to perform a cryptographic operation has been provided to the identified self-encrypting key management service.

5. The method of claim 1, wherein the characteristic of the identified self-encrypting key management service satisfies the threshold criterion if a number of cryptographic operations being provided by the identified self-encrypting key management service is least among the plurality of self-encrypting key management services.

6. The method of claim 1, wherein the characteristic of the identified self-encrypting key management service satisfies the threshold criterion if a number of applications for which the identified self-encrypting key management service has provided cryptographic operations over a threshold period of prior time is least among the plurality of self-encrypting key management services.

7. The method of claim 1, wherein the threshold criterion comprises a threshold processing capacity criterion associated with the application, and
wherein the characteristic of the identified self-encrypting key management service satisfies the threshold criterion if a processing capacity of the identified self-encrypting key management service satisfies the threshold processing capacity criterion associated with the application.

8. The method of claim 1, wherein the characteristic of the identified self-encrypting key management service satisfies the threshold criterion if a location of a first network server that hosts the identified self-encrypting key management service is nearest to a second network server that hosts the application.

9. The method of claim 1, wherein each of the plurality self-encrypting key management services receives one or more requests from the gateway.

10. The method of claim 1, wherein the client identification is specified in the request.

11. The method of claim 1, wherein the client identification identifies a user of the application.

12. The method of claim 1, wherein the shared storage resource is supported by a plurality of storage elements.

13. The method of claim 1, wherein each secure enclave key of the plurality of secure enclave keys is based on a respective internal key that is internal to a respective processing device of a plurality of processing devices, and is further based on an identification of a respective self-encrypting key management service of the plurality of self-encrypting key management services.

14. The method of claim 13, wherein the specified application key is stored at a first self-encrypting key management service, and responsive to a second self-encrypting key management service being created, the specified application key is securely provided from the first self-encrypting key management service to the second self-encrypting key management service.

15. The method of claim 13, wherein the specified application key is stored at each secure enclave of the plurality of secure enclaves.

16. The method of claim 1, wherein the interface of the self-encrypting key management service is one of: a Public Key Cryptography Standards (PKCS) #11 interface, a Key Management Interoperability Protocol (KMIP) interface, or a Representational State Transfer (REST) interface.

17. A system comprising:
a memory; and
a processing device, operatively coupled with the memory, to:
receive, from an application, a request to perform a cryptographic operation with a specified application key wherein the application is associated with a client identification;
identify a gateway associated with the client identification;
identify a respective characteristic of each self-encrypting key management service of a plurality of self-encrypting key management services that correspond to the gateway, wherein each of the plurality of self-encrypting key management services is associated with a respective secure enclave of a plurality of secure enclaves, wherein the specified application key is encrypted at each of the plurality of secure enclaves by a respective secure enclave key of a plurality of secure enclave keys, and wherein the specified application key is stored in a shared storage resource accessible by each of the plurality of self-encrypting key management services;
identify a self-encrypting key management service of the plurality of self-encrypting key management services, wherein a characteristic of the identified self-encrypting key management service satisfies a threshold criterion; and
send the request to the identified self-encrypting key management service, wherein the request identifies, using an interface of the self-encrypting key management service, a type of cryptographic operation to be performed by a cryptographic operation component of the self-encrypting key management service.

18. The system of claim 17, wherein the characteristic of the identified self-encrypting key management service comprises a number of cryptographic operations for one or more other applications that are being performed by the identified self-encrypting key management service.

19. A non-transitory computer readable medium comprising data that, when accessed by a processing device, cause the processing device to perform operations comprising:
receiving, from an application, a request to perform a cryptographic operation with a specified application key wherein the application is associated with a client identification;
identifying a gateway associated with the client identification;
identifying a respective characteristic of each self-encrypting key management service of a plurality of self-encrypting key management services that correspond to the gateway, wherein each of the plurality of self-encrypting key management services is associated with a respective secure enclave of a plurality of secure enclaves, wherein the specified application key is encrypted at each of the plurality of secure enclaves by a respective secure enclave key of a plurality of secure enclave keys, and wherein the specified application key is stored in a shared storage resource accessible by each of the plurality of self-encrypting key management services;
identifying a self-encrypting key management service of the plurality of self-encrypting key management services, wherein a characteristic of the identified self-encrypting key management service satisfies a threshold criterion; and
sending the request to the identified self-encrypting key management service, wherein the request identifies, using an interface of the self-encrypting key management service, a type of cryptographic operation to be performed by a cryptographic operation component of the self-encrypting key management service.

* * * * *